(12) United States Patent
Ofstad

(10) Patent No.: US 8,570,329 B1
(45) Date of Patent: Oct. 29, 2013

(54) SUBTLE CAMERA MOTIONS TO INDICATE IMAGERY TYPE IN A MAPPING SYSTEM

(71) Applicant: Andrew Ofstad, San Francisco, CA (US)

(72) Inventor: Andrew Ofstad, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/665,765

(22) Filed: Oct. 31, 2012

(51) Int. Cl.
*G06T 13/00* (2011.01)
(52) U.S. Cl.
USPC .......................................................... 345/473
(58) Field of Classification Search
USPC .......................................................... 345/473
See application file for complete search history.

(56) References Cited

U.S. PATENT DOCUMENTS

| | | | |
|---|---|---|---|
| 7,206,017 B1 * | 4/2007 | Suzuki ............................. | 348/36 |
| 7,631,277 B1 * | 12/2009 | Nie et al. ......................... | 715/848 |
| 2011/0105192 A1 * | 5/2011 | Jung et al. ...................... | 455/566 |
| 2011/0254915 A1 * | 10/2011 | Vincent et al. .................. | 348/36 |
| 2012/0011464 A1 * | 1/2012 | Hayashi et al. ................. | 715/784 |
| 2012/0299920 A1 * | 11/2012 | Coombe et al. ................ | 345/423 |

\* cited by examiner

*Primary Examiner* — Aaron M Richer
*Assistant Examiner* — Vu Nguyen
(74) *Attorney, Agent, or Firm* — Marshall, Gerstein & Borun LLP

(57) ABSTRACT

A technique for providing a subtle indication of imagery type can be implemented in a software application, such as a mapping application, that displays interactive imagery in a three-dimensional scene and allows users to tap, click, or otherwise select points within the displayed images to pull up corresponding detailed photographs. A pulled-up photograph may be laid out on a surface having a curvature (e.g., the surface of a sphere or a cylinder), in which case the viewport slides along the photograph in a three-dimensional space as the photograph is inspected, or on a surface having no curvature (i.e., the photograph is flat), in which case the viewport pans along the photograph in a two-dimensional space. However, at the time when a user selects a point within the interactive image, the user does not know whether the photograph associated with this point is laid out on a curved surface or a flat surface. To provide a subtle indication of whether the photograph is laid out on a curved surface or a flat surface, the user interface temporarily repositions the viewport along the surface of the photograph.

23 Claims, 11 Drawing Sheets

US 8,570,329 B1

SUBTLE CAMERA MOTIONS TO INDICATE IMAGERY TYPE IN A MAPPING SYSTEM

FIELD OF TECHNOLOGY

The present invention relates to electronic mapping systems and, more specifically, to the use of subtle camera motions to indicate imagery types in a mapping system.

BACKGROUND

Currently available mapping systems allow the user to interact within a three-dimensional space to explore an area such as a streetscape. In simple implementations, mapping systems present the user with a viewport including a three-dimensional rendering of a given street generated with generic graphics. The generic graphics rendered within a three-dimensional street may include three-dimensional polygon representations of buildings known to exist along the street and projected satellite imagery from above. The mapping system may render these generic graphics from large databases of satellite imagery.

However, due to the relatively low quality of satellite imagery from above when viewed at the micro-level of a street, some current mapping systems supplement the generic graphics with user generated imagery, for example two-dimensional photographs and three-dimensional panoramas. These two-dimensional photographs and three-dimensional panoramas provide high quality imagery that may not be available using generic satellite databases, and may provide a level of imagery resolution that is not available using three-dimensional polygon representations of buildings. Users may submit these photographs and panoramas voluntarily to the mapping service, for example, through crowd-sourcing efforts, or the mapping service may commission a large-scale effort to capture street-level photographic and panoramic imagery.

More advanced mapping systems may project these user generated two-dimensional and three-dimensional photographs together onto the three-dimensional space, for example a streetscape, to better allow the user to explore the three-dimensional space. The user may select the user-generated imagery projected onto the three-dimensional space in order to interact with the user-generated imagery independent of the three-dimensional space.

One issue that may arise when selecting two-dimensional or three-dimensional imagery is that the user may not understand whether the imagery is in fact two-dimensional or three-dimensional or how to best navigate the user-generated imagery. For example, a user may click on and navigate a user-generated two-dimensional photo by first selecting the photo in the three-dimensional space and panning the photo in two dimensions. The user may alternatively click on and navigate a user-generated three-dimensional panorama in the three-dimensional space by rotating the panorama in three dimensions. When the user selects the user-generated imagery in the three-dimensional space, the user may not understand which user-generated imagery is two-dimensional and which user-generated imagery is three-dimensional. Thus, the user may have no indication or instructions to navigate the selected user-generated imagery in two-dimensions or three-dimensions in the most efficient or intuitive means possible.

Some mapping systems may indicate, through a label or other obtrusive rendered indicator, that the user may navigate the user-generated imagery in two or three dimensions. However, these labels or rendered indicators typically obscure the image or distract the user from the image. Alternatively, the label or rendered indicator may not be immediately apparent to the user, presenting the same issue as providing no indicator whatsoever.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In one embodiment, a computer-implemented method indicates the curvature of a digital image via rendered subtle camera motions on a user interface. The computer-implemented method includes rendering a representation of the digital image on a user interface, enabling selection of the representation of the digital image via the user interface, determining the curvature of at least one axis of the digital image, and rendering an animated indication of the curvature of at least one axis of the digital image via the user interface.

In another embodiment, a computer system indicates the curvature of a digital image by rendering subtle camera motions via a user interface. The computer system includes a first processor, a first memory communicatively coupled to the first processor, and a user interface communicatively coupled to the first processor. The first memory includes a digital image and instructions that, when executed by the first processor, cause the first processor to render a representation of the digital image on the user interface, receive a selection of the representation of the digital image from the user interface, determine the curvature of at least one axis of the digital image, and render an animated indication of the curvature of at least one axis of the digital image via the user interface.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

An image display system, which displays images in a three dimensional scene to a user, uses subtle camera motions that change the perspective of a user in the scene to indicate the curvature or type of the image being displayed, such whether the image is a panorama, a spherical scene, or a flat photograph, to enable a user to easily determine the navigation options available for the image. The image display system that uses subtle camera motions, such as panning, rotating, zooming, or flipping the image using the image display system, intuitively indicates to the user that an image contains or lacks curvature by slightly changing the perspective of the user without obscuring the image with a label or requiring the user to read a written label. The subtle camera motions also provide the benefit of demonstrating the navigational options available to the user without obscuring the image with icons or requiring the user to read cumbersome navigation instructions. Thus, the image display system that uses subtle camera motions to indicate image type provides the distinct advantage of indicating curvature in an image and instructing the user of the available navigation options without requiring the user to observe anything other than the image itself and the subtle camera motions thereof.

Figure 1:
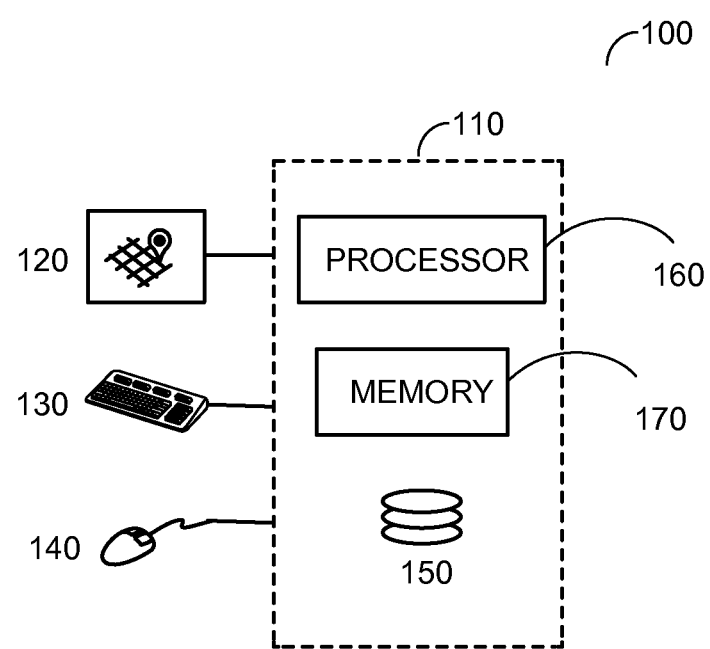
FIG. 1 is a high-level view of a stand-alone system for indicating imagery type with subtle camera motions.

Turning to FIG. 1, an image display system 100, which uses subtle camera motions to enable a user to easily determine the navigational options available for the image, includes an image rendering unit 110 that generally stores and displays images on a display 120, and that accepts user inputs from a keyboard 130 and pointing device 140. The image rendering unit 110 stores images of differing curvatures in a database 150 that a processor 160 retrieves and renders on the display 120 by executing instructions stored in a memory 170. Generally speaking, the processor 160 determines the curvature of the image retrieved from the database 150 and renders subtle camera motions on the display 120 to both indicate the curvature of the image and instruct the user of the system 100 how to navigate the image. The user of the system 100, having observed the subtle camera motions on the display 120, and aware of the curvature of the image and available navigational options, may navigate the image more effectively using the keyboard 130 and pointing device 140.

Figure 2:
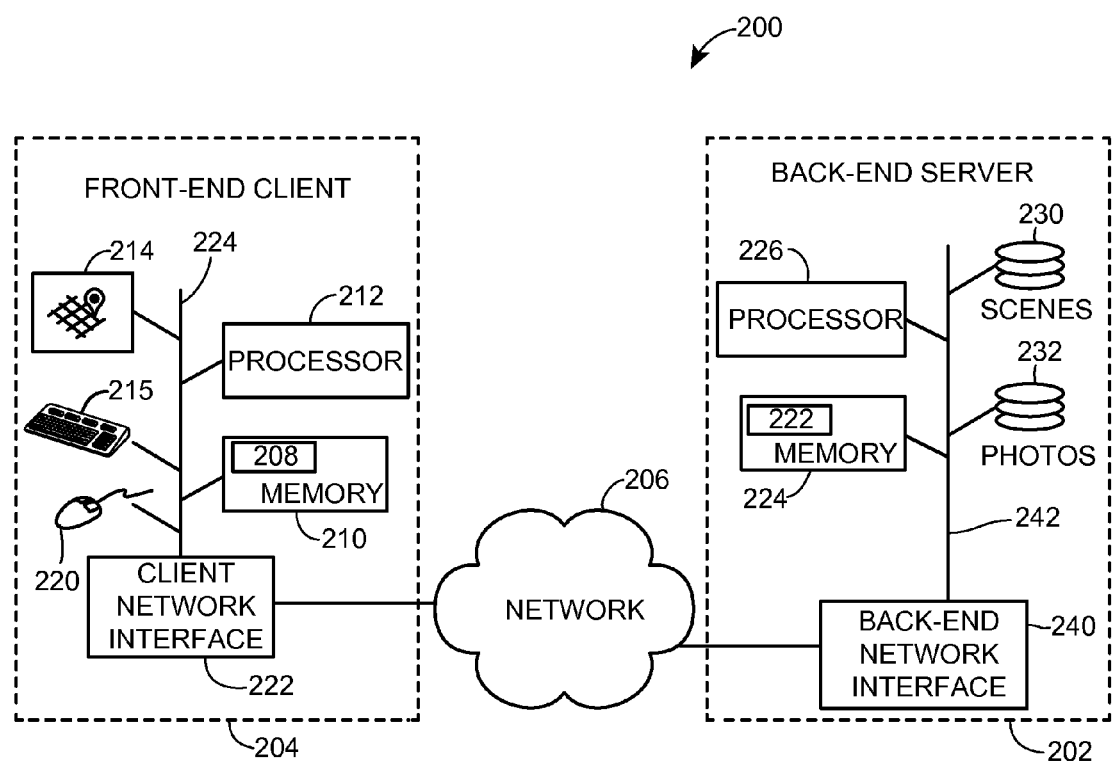
FIG. 2 is a high-level view of a client-server system for indicating imagery type with subtle camera motions.

In another embodiment, for example, the system 200 illustrated in FIG. 2, the database containing the imagery of differing types resides within a back-end server 202, instead of a singular image rendering unit 110 in the embodiment illustrated in FIG. 1. In the system 200 of FIG. 4, front-end client 204, connected to the back-end server 202 through a network 206, renders subtle camera motions similar to the image rendering unit 110, to enable a user to easily determine the navigational options available for a particular image retrieved from the back-end server 202.

Generally, FIG. 2 illustrates the system 200 as a system that renders two-dimensional and three-dimensional images on a display for a user and that indicates the image type and available navigational options with subtle camera motions. The system 200 generally includes a back-end server 202 and a front-end client 204 interconnected by a communication network 206. The front-end client 204 includes executable instructions 208 contained in a memory 210, a processor 212, a display 214, a keyboard 218, a pointing device 220, and a client network interface 222 communicatively coupled together with a front-end client bus 224. The client network interface 222 communicatively couples the front-end client 204 to the network 206. The back-end server 202 includes instructions 222 contained in a memory 224, a processor 226, a database containing scenes 230, a database containing two-dimensional and three-dimensional photographs 232, and a back-end network interface 140 communicatively coupled together with a back-end server bus 242.

Generally, the front-end client 204, executing instructions 208 in the processor 212, renders photographs retrieved from the photograph database 232 onto a three dimensional scene retrieved from the scenes database 230 and renders the photographs and the scene together on the display 214. The user generally interacts with the front-end client 204 by using the pointing device 220 and the keyboard 218 to select two-dimensional and three-dimensional photographs in a three-dimensional scene rendered on a display 214. Selecting a two-dimensional or three dimensional photograph from a three-dimensional scene causes the processor 212 to send a request to the back-end server 202 to execute instructions 222 to retrieve the selected photograph from to the back-end server 202 and to transmit the selected photograph back to the front-end client 204. The front-end client 204, executing instructions 208, indicates the type of imagery retrieved, for example, whether the image is two-dimensional or three-dimensional, by automatically rendering subtle camera motions on the display 214, thereby instructing the user how to navigate the image more effectively.

Figure 3:
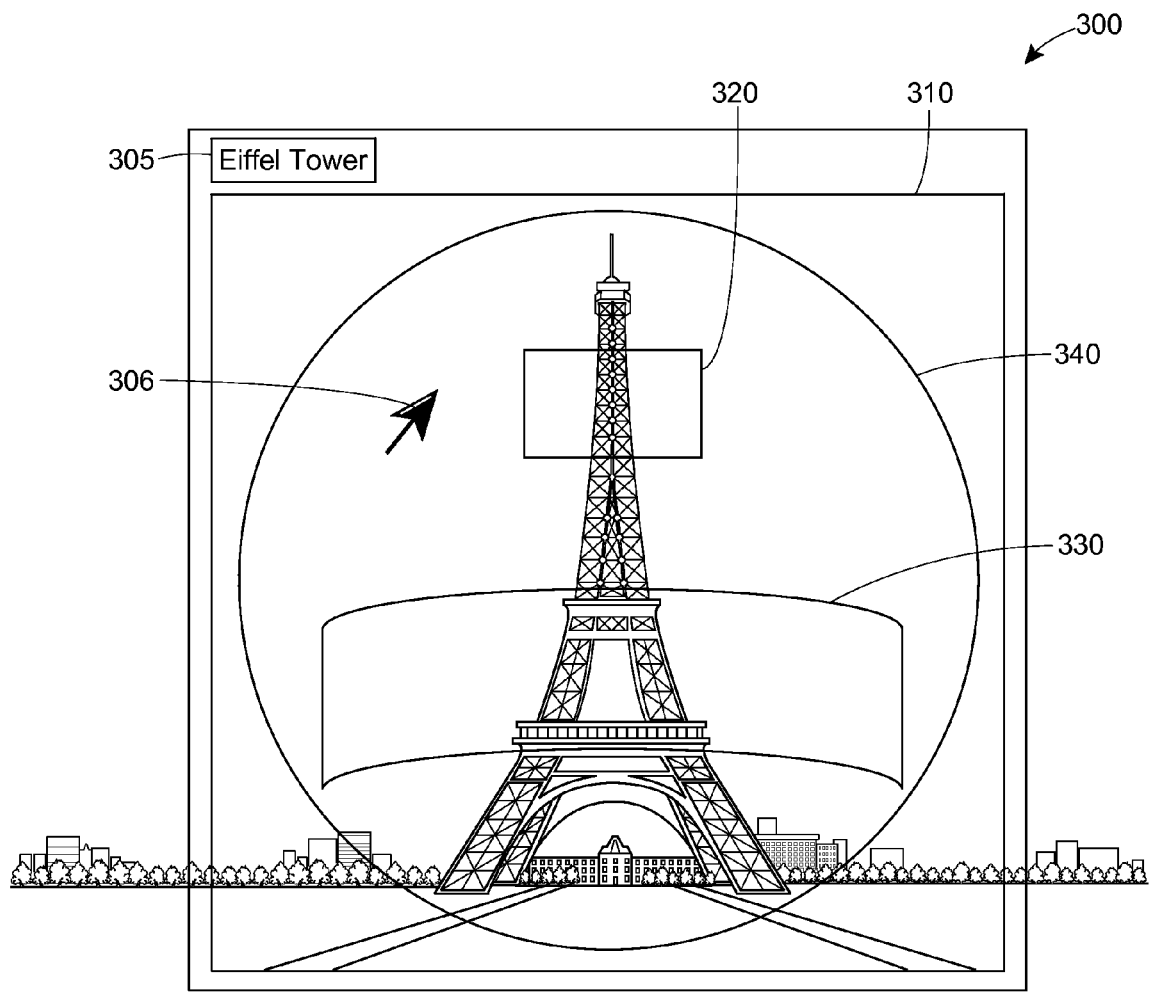
FIG. 3 is an illustration of a three-dimensional mapping application window with rendered two-dimensional and three-dimensional imagery available for a user to select.

The display 206 in the front-end client 205 may render an application window 300 as illustrated in FIG. 3. The user navigates a three dimensional scene rendered in the mapping application window 300 containing, for example, a ground-level streetscape depicting the Eiffel Tower in Paris, France using the keyboard 215 and pointing device 220. The mapping application window 300 includes a search box 305 to enter a destination, a cursor 306 controlled by the pointing device 220 that the user uses to navigate and select items within the application window 300, and a viewport 310. The three-dimensional scene depicted within the viewport 310 may contain a two-dimensional flat photograph 320 rendered into the three-dimensional scene within the viewport 310 with outlining indicating the boundaries of the two-dimensional flat photograph 320. The outlining of the two-dimensional flat photograph 320 becomes more distinctive when the cursor 306 hovers over the two-dimensional flat photograph 320. The distinctive highlighting of the two-dimensional flat photograph 320 indicates that the two-dimensional photograph 320 may expand with options to navigate the two-dimensional photograph 320 independent of the three-dimensional scene within the viewport 210. The user may select the two-dimensional flat photograph 320 for example with a click of the pointing device 220 in order to navigate the two-dimensional flat photograph 320 independent of the three-dimensional scene.

In a similar manner, the three dimensional scene within the viewport 310 contains a three-dimensional cylindrical photograph 330 that is rendered onto part of the three-dimensional scene with outlining indicating the boundaries of the three-dimensional cylindrical photograph 330. Again, the outlining of the three-dimensional cylindrical photograph 330 may become more distinctive when the cursor 306 hovers over the three-dimensional cylindrical photograph 330. The distinctive highlighting of the three dimensional cylindrical photograph 230 indicates that the three dimensional cylindrical photograph 330 may expand with options to navigate the three-dimensional cylindrical photograph 330 independent of the three dimensional scene. The user may select the three-dimensional cylindrical photograph 330 for example with a click of the pointing device 220 in order to navigate the three-dimensional cylindrical photograph 330 independent of the three-dimensional scene.

Likewise, the three-dimensional scene within the viewport 310 may contain a three-dimensional spherical photograph 340 that is rendered onto part of the three-dimensional scene with outlining indicating the boundaries of the three-dimensional spherical photograph 340. Again, the outlining of the three-dimensional spherical photograph 340 may become more distinctive when the cursor 306 hovers over the three-dimensional spherical photograph 340. The distinctive highlighting of the three-dimensional spherical photograph 340 indicates that the three-dimensional spherical photograph 340 may expand with options to navigate the three-dimensional spherical photograph 340 independent of the three dimensional scene. The user may select the three-dimensional spherical photograph 340 for example with a click of the pointing device 220 in order to navigate the three-dimensional spherical photograph 340 independent of the three-dimensional scene.

Figure 4:
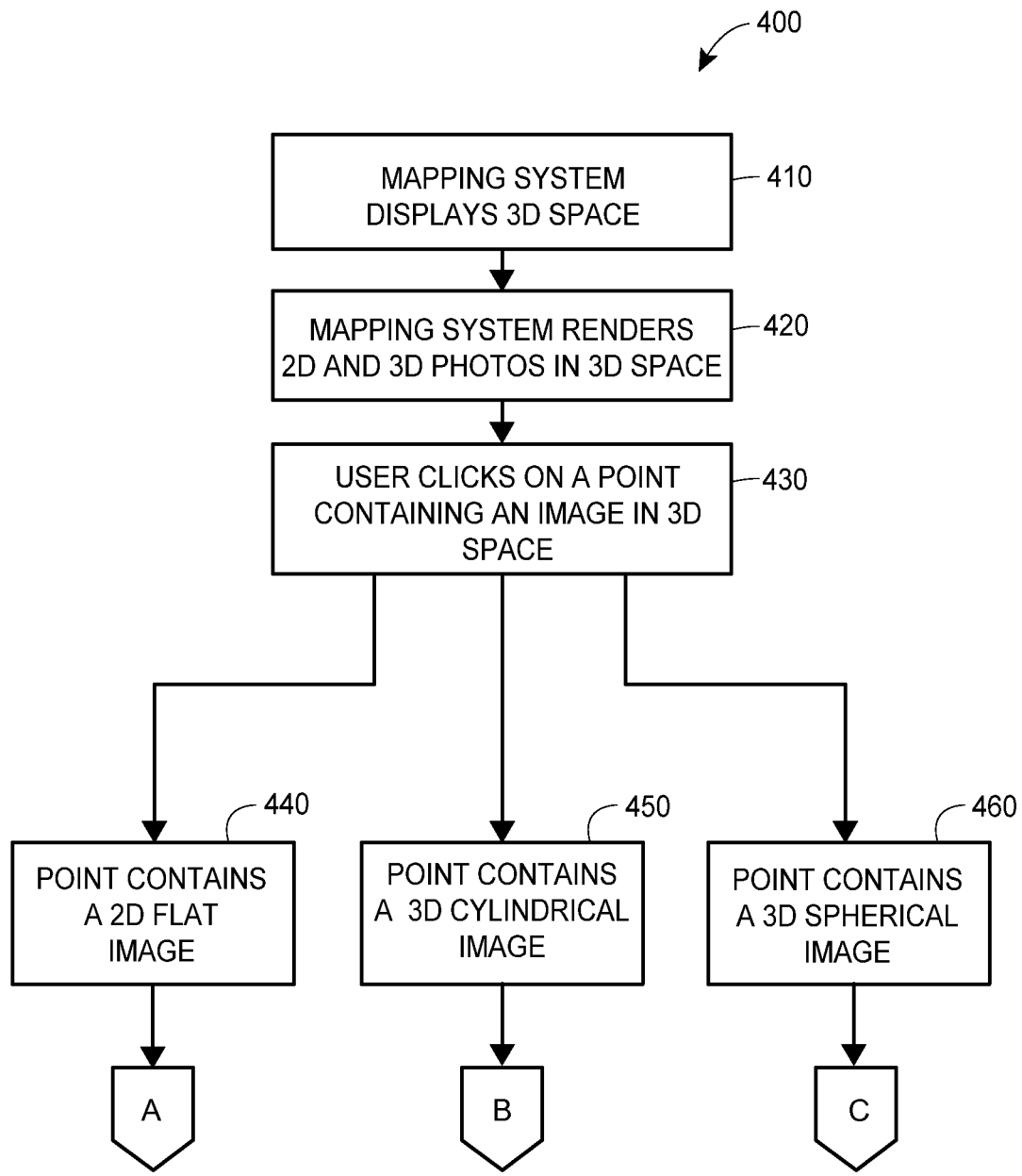
FIG. 4 is a flowchart illustrating a high-level method of selecting two-dimensional and three-dimensional photographs within a three-dimensional mapping system.

A user may interact with the application window 300 rendered in the display 214 using the method 400 illustrated in FIG. 4. The flowchart illustrated in FIG. 4 illustrates a method 400 that uses the system 200 to render mixed two-dimensional and three-dimensional photographs in a three-dimensional scene and allow the user to select an individual photograph for rendering and navigation independent from the three-dimensional scene.

The user, following the process 400, selects among the two-dimensional flat photograph 320, the three-dimensional cylindrical photograph 330, or the three-dimensional spherical photograph 340 illustrated in FIG. 3. More particularly, the method 400 begins at step 410 by executing instructions 208 in the processor 212 to send a request from the front-end client 204 to the back-end server 202 via the network 206 for retrieval of a three dimensional scene in the scenes database 230. The system 200 specifies a particular three-dimensional scene to retrieve from the scenes database 230 for example using the search box 305 in FIG. 3. The back-end server 202, executing instructions 222, retrieves the indicated three-dimensional scene from the scenes database 230 and transmits the three-dimensional scene back to the front-end client 204 via the network 206. The front-end client 204, executing instructions 208 in the processor 212, stores the three-dimensional scene in the memory 210, and renders the three-dimensional scene in the display 214.

The method 400 continues with step 420 that retrieves the two-dimensional and three-dimensional photographs that may exist within the boundaries of the viewport 310 of the three-dimensional scene from the back-end server 202 and renders the two-dimensional and three-dimensional photographs on the display 214 together with the three-dimensional scene. The processor 212, executing instructions 208, transmits identifying information about the currently displayed three-dimensional scene to the back-end server 202 via the network 206. The back-end server 202, executing instructions 222 in the processor 226, retrieves the two-dimensional and three-dimensional photographs within the three-dimensional scene from the photographs database 232 and transmits the photographs back to the front-end client 204 via the network 206. The front-end client 204, executing instructions 208 in the processor 212, stores the photographs in the memory 210 and renders the photographs into the three-dimensional scene on the display 214. In one case, the rendered photographs 320, 330, and 340 appear as continuous illustrations of the three-dimensional scene in the viewport 310.

The method 400 continues to step 430 where a user interacting with the system 200 using the pointing device 220 and the keyboard 218 selects a particular photograph in the three-dimensional scene rendered on the display 214. The user selects a particular two-dimensional or three-dimensional photograph in the three-dimensional scene for example with the click of the pointing device 220 within the outlined boundaries of a photograph. Selecting a particular photograph causes the processor 212 to execute instructions 208 that determine if the selected photograph stored in the memory 210 contains or lacks curvature, and is two-dimensional, three-dimensional cylindrical, or three-dimensional spherical.

If the processor 212, executing instructions 208 determines at step 430 that the pointing device 220 was within the boundaries of a two-dimensional photograph, for example the two-dimensional photograph 320 in FIG. 3, then the processor executes the instructions 208 in the processor 212 at a step 440. At the step 440 the processor 212 executes the instructions 208 to begin the process 670, illustrated in FIG. 6, that displays the two-dimensional photograph 320 independent of the three-dimensional scene and subtly indicates with an automatic camera motion that the two-dimensional photograph 220 lacks curvature and is in fact two-dimensional and can be navigated in a two-dimensional manner.

Figure 5:
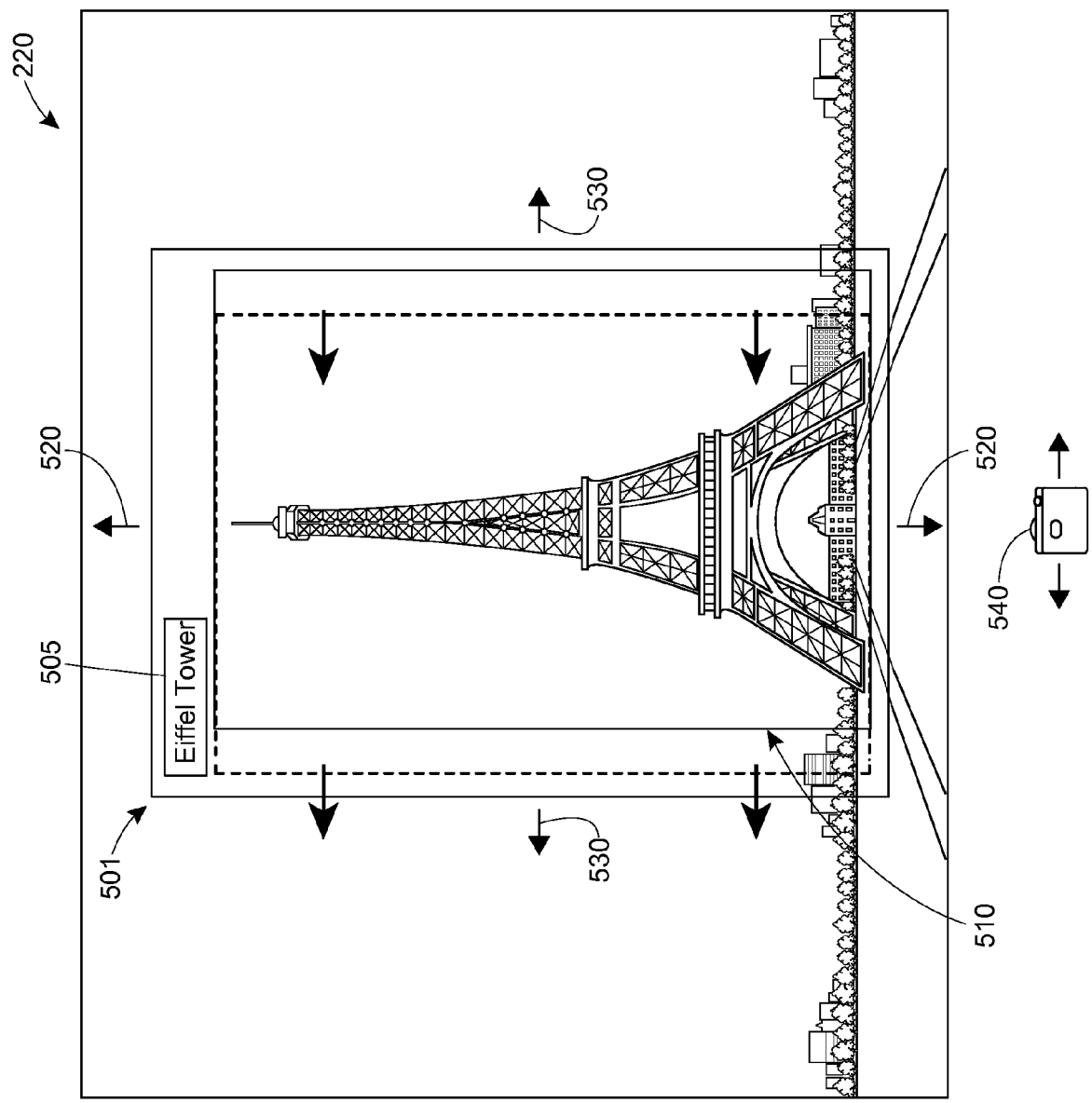
FIG. 5 is an illustration of a two-dimensional viewport including a flat photograph and an indication of the movements available for the viewport in a two-dimensional flat space.

Turning to FIG. 5, the user navigates the selected two-dimensional flat photograph 320 using an application window 501 rendered on the display 214. The application window 501 contains similar features as the application window 300 in FIG. 3, for example a search box 505, and a viewport 510. However, the user may navigate the two-dimensional flat photograph 320 using the application window 501 independent from the three-dimensional scene in the viewport 310 in FIG. 3. The user may navigate the flat two-dimensional photograph 320 in the vertical direction 520 or horizontal direction 530 from the perspective of a user represented by a virtual camera 540. The viewport 510 may include a portion of the two-dimensional flat photograph 320 as illustrated, or include the entire two-dimensional flat photograph 320. The viewport 510 may be restricted from navigating outside of the boundaries of the flat photograph 320.

In order to indicate to the user the available vertical 520 and horizontal 530 navigation capabilities, and to illustrate the that the two-dimensional flat photograph 320 lacks curvature, the viewport 510 moves along the vertical 520 and horizontal 530 directions of the two-dimensional photograph 320 automatically prior to allowing the user to navigate of the two-dimensional flat photograph 320 within the viewport 510. The automatic movement of the viewport 510 may include a circular or strictly up and down motion and continues for a short duration prior to ceasing. The automatic movement of the viewport 510 in the vertical 520 and horizontal 530 directions along the two-dimensional flat photograph 320 illustrates a two-dimensional perspective for the virtual camera 540 and indicates the available navigation options for the user. Thus, when the automatic movement of the viewport 510 ceases, the user is aware of the available navigation options and that the two-dimensional photograph 320 lacks curvature prior to any user directed navigation.

Figure 6:
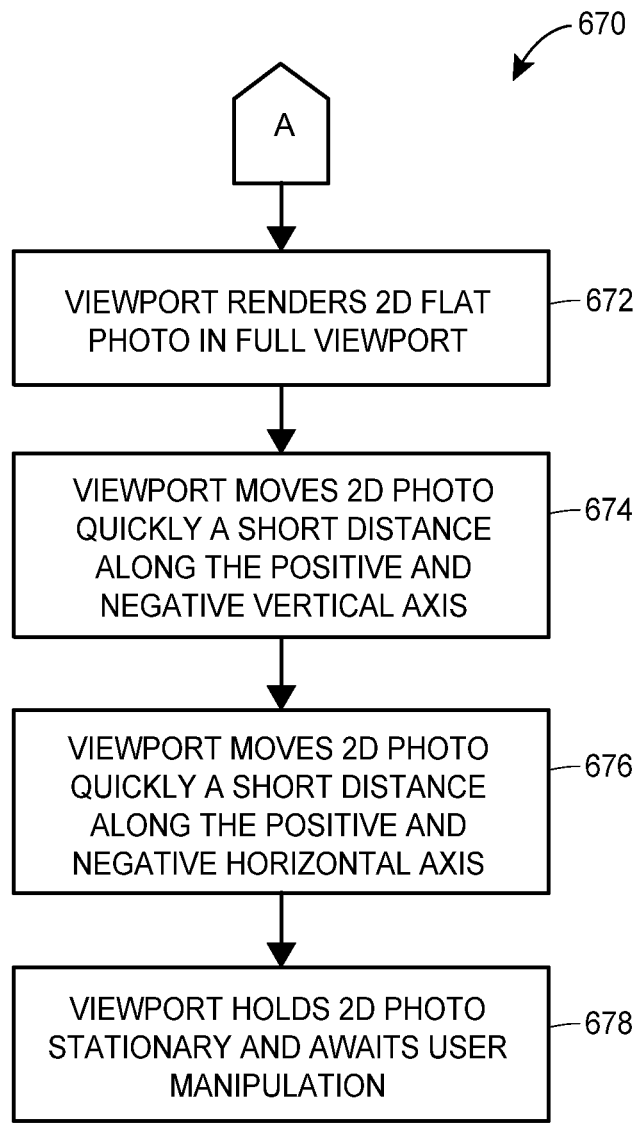
FIG. 6 is a flowchart illustrating a method that indicates the movements available for a viewport within the selected two-dimensional flat photograph.

A method 670 illustrated in FIG. 6, continuing from step 440 in FIG. 4, generally illustrates how the system 200 renders a subtle camera motion to indicate the lack of curvature of a two-dimensional flat photograph and demonstrate the available navigation options. The processor 212, executing instructions 208 at a step 672 renders part or all of the two-dimensional photograph 320 in a viewport of an application window, similar to the viewport 510 of the application window 501 illustrated in FIG. 5. The system 200 indicates that the photograph is in fact two-dimensional, lacks curvature, and may demonstrate the available vertical range of motion of the viewport within the photograph to the user by executing instructions 208 in the processor 212 at step 674 to render the viewport 510 in the application window 501 on the display 214 moving vertically up the two-dimensional photograph 320 a short distance. The processor 212 continues to render the viewport 510 within the application window 501 moving vertically down the two-dimensional photograph 320 a short distance, returning to the original rendered position on the photograph 320.

Likewise to further indicate to the user that the photograph is in fact two-dimensional, lacks curvature, and to possibly demonstrate the available horizontal range of motion of the viewport within the photograph, the processor 212 executing instructions 208 at step 676 renders the viewport 510 in the application window 501 on the display 214 moving horizontally left along the two-dimensional photograph 320 a short distance. The processor 212 continues to render the viewport 510 within the application window 501 moving horizontally right along the two-dimensional photograph 320 a short distance, returning to the original rendered position on the photograph 320.

The vertical and horizontal motion of the viewport within the two-dimensional photograph 320 subtly indicates to the user that the photograph is in fact two dimensional, lacks curvature, and demonstrates the available navigation options without obscuring the photograph with indicators or printed instructions. While the steps 674 and 676 recite embodiments including vertical and horizontal subtle motions of the viewport 510 along the photograph 320 to indicate image type, additional movements such as spiral, circular, or diagonal movements may be used to provide additional subtle indications of the two-dimensional nature of the photograph and demonstrate the available navigation options.

Continuing to step 678, the processor 212, executing instructions 208 holds the photograph 320 stationary and awaits user manipulation of the photograph 320 with the pointing device 220 or keyboard 218 within the viewport 520 in the two-dimensional horizontal and vertical direction, as demonstrated with the automatic subtle vertical and horizontal motions in steps 674 and 676.

Returning to the method 400 illustrated in FIG. 4, if the processor 212, executing instructions 208 determines at the step 430 that the pointing device 220 was within the boundaries of a three-dimensional cylindrical photograph, for example, the three-dimensional cylindrical photograph 330 in FIG. 3, then the processor executes instructions 208 in the processor 212 at step 450. At the step 450 the processor 212 executes instructions 208 to begin a process 880, illustrated in FIG. 8, that displays the three-dimensional cylindrical photograph 330 independent from the three-dimensional scene and subtly indicates with an automatic camera motion that the three-dimensional cylindrical photograph 330 is in fact three-dimensional, contains curvature in one axis, and can be navigated in a three-dimensional cylindrical manner.

Figure 7:
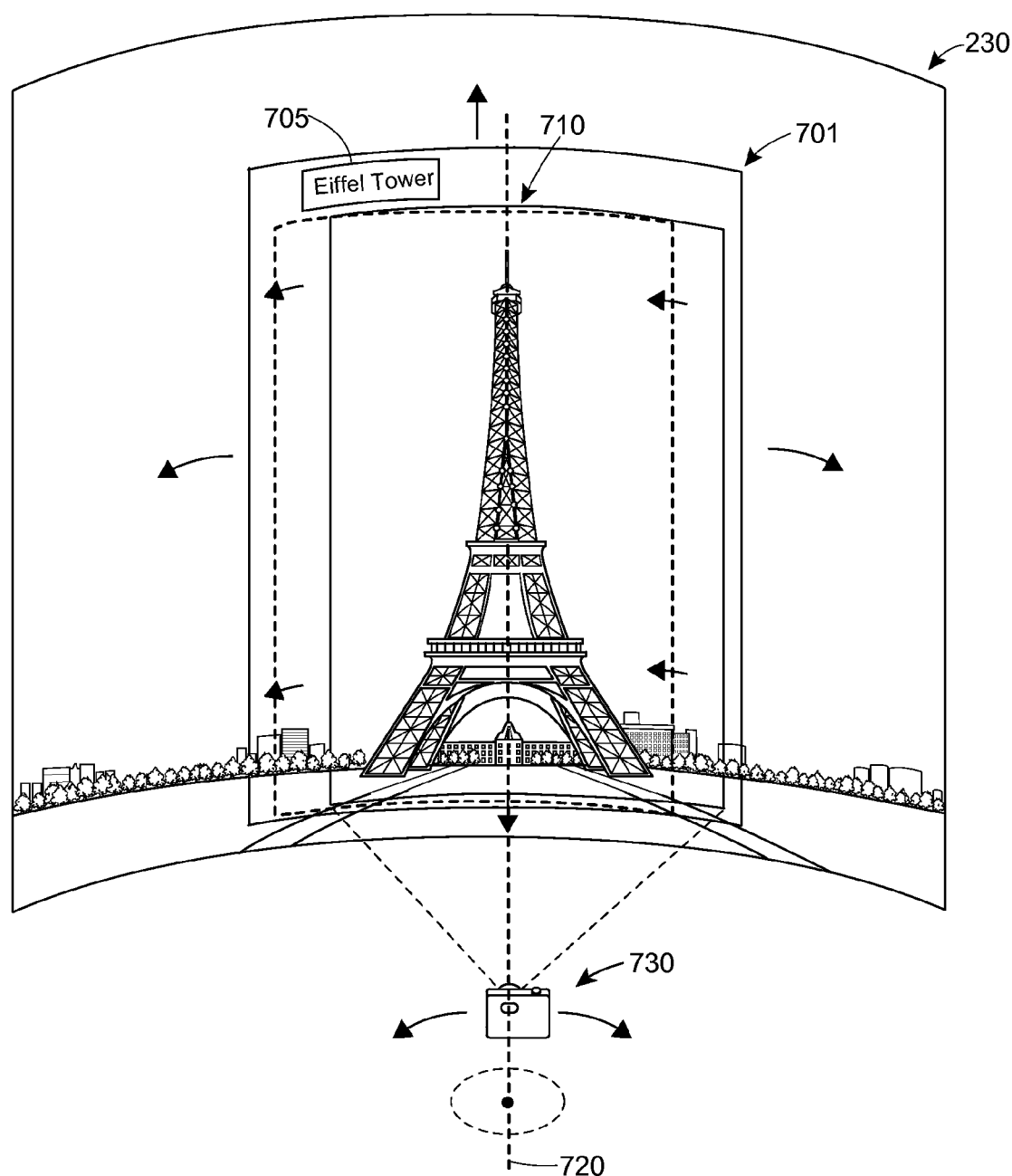
FIG. 7 is an illustration of a three-dimensional cylindrical viewport including a three-dimensional cylindrical photograph and an indication of the movements available for the viewport in a three-dimensional cylindrical space.

Turning to FIG. 7, the user navigates the selected three-dimensional cylindrical photograph 330 in an application window 701 rendered on the display 214. The application window 701 contains similar features as the application window 300 in FIG. 3 and the application window 501 in FIG. 5. For example, the application window 701 contains a search box 705 and a viewport 710. However, the user navigates the three-dimensional cylindrical photograph 230 independent from the three-dimensional scene in the viewport 210 in FIG. 2. The user navigates the three-dimensional cylindrical photograph 330 by rotating horizontally along a vertical axis 720 of the three-dimensional cylindrical photograph 330 and panning the three-dimensional cylindrical photograph 330 vertically along the vertical axis 720 from the perspective of a user represented by a virtual camera 730. The viewport 710 may include a portion of the three-dimensional cylindrical photograph 330 as illustrated, or include the entire three-dimensional cylindrical photograph 330. The viewport 710 may be restricted from navigating outside the boundaries of the three-dimensional cylindrical photograph 330.

In order to indicate the available horizontal rotation and vertical panning navigation capabilities of the viewport 710 along the horizontal axis 720 of the three-dimensional cylindrical photograph 330 and to illustrate the three-dimensional nature of the three-dimensional cylindrical photograph 330, the viewport 710 automatically moves prior to allowing navigation. The automatic movement of the viewport 710 may include a circular or strictly vertical and horizontal movement and the movement may continue for a short duration prior to ceasing. The automatic movement of the viewport 710 in the vertical and horizontal directions along the vertical axis 720 of the three-dimensional cylindrical photograph 330 illustrates a three-dimensional perspective for the virtual camera 730, demonstrates the curvature in one axis of the photograph 330, and indicates the available navigational options for the user. When the automatic movement of the viewport 710 ceases, the available navigational options for the three-dimensional cylindrical photograph 330 are apparent to the user prior to any user directed navigation. Thus, when a user begins navigation of the three-dimensional cylindrical photograph 330 after the automatic movement of the viewport 710 ceases, the user understands the available navigations options of the three-dimensional photograph 330.

Figure 8:
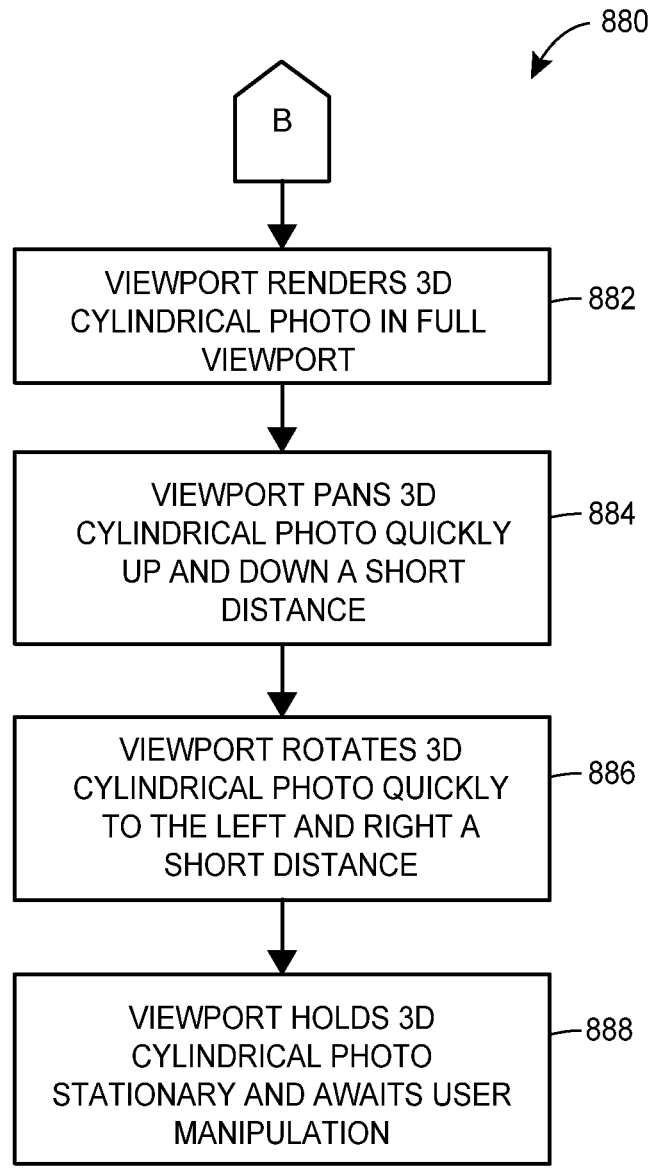
FIG. 8 is a flowchart illustrating a method that indicates the movements available for a viewport within the selected three-dimensional cylindrical photograph.

Turning to the method 880 illustrated in FIG. 8, continuing from step 450 in FIG. 4, the processor 212, executing instructions 208 at step 882 renders the three-dimensional cylindrical photograph 330 independent of the three-dimensional scene on the display 214. The processor 212, executing instructions 208 at step 882 may render part or all of the three-dimensional cylindrical photograph 330 in a viewport of an application window, similar to the viewport 710 of the application window 701 illustrated in FIG. 7. In order to indicate to the user that the photograph is three-dimensional cylindrical containing curvature in one axis but lacking curvature in another axis, and to demonstrate the available vertical range of motion of the viewport within the photograph, the processor 212 executing instructions 208 at step 884 renders the viewport 710 in the application window 701 on the display 214 panning vertically up the three-dimensional cylindrical photograph 330 a short distance. The processor 212 continues to render the viewport 710 within the application window 701 panning vertically down the three-dimensional cylindrical photograph 330 a short distance, returning to the original rendered position on the photograph 330.

Likewise, to further indicate to the user that the photograph is three-dimensional cylindrical, lacking curvature in one axis but containing curvature in another axis, and to demonstrate the available horizontal rotation of the viewport within the photograph, the processor 212 executing instructions 208 at step 886 renders the viewport 710 in the application window 701 on the display 214 rotating horizontally left along the three-dimensional cylindrical photograph 330 a short distance. The processor 212 continues to render the viewport 710 within the application window 701 rotating horizontally right along the three-dimensional cylindrical photograph 330 a short distance, returning to the original rendered position on the photograph 330.

The vertical panning and horizontal rotation of the viewport within the three-dimensional cylindrical photograph subtly indicates to the user that the photograph is in fact three-dimensional cylindrical containing curvature in one axis and lacking curvature in another axis, and demonstrates the navigation options without obscuring the photograph with indicators or printed instructions. While steps 884 and 886 recite embodiments comprising vertical and horizontal subtle motion of the viewport 710 along the photograph 330, additional movements such as spiral, circular, or diagonal movements may provide additional subtle indications of the three-dimensional cylindrical nature of the photograph and the curvature of the axes of the photograph, and the navigation options available to the user along each axis.

Continuing to a step 888, the processor 212, executing instructions 208 holds the photograph 330 stationary and awaits user manipulation of the photograph 330 with the pointing device 220 or keyboard 218 within the viewport 710 in the two-dimensional horizontal and vertical direction, as demonstrated with the automatic subtle vertical and horizontal motion in steps 884 and 886.

Returning again to method 400 illustrated in FIG. 4, if the processor 212, executing instructions 208 determines at the step 430 that the pointing device 220 was within the boundaries of a three-dimensional spherical photograph, for example the three-dimensional spherical photograph 340 in FIG. 3, then the processor 212 may execute instructions 208 in the processor 212 at step 460. At step 460 the processor 212 may execute instructions 208 to begin the process 1090, illustrated in FIG. 10, that displays the three-dimensional spherical photograph 340 independent from the three-dimensional scene and subtly indicates with an automatic camera motion that the three-dimensional spherical photograph 340 is in fact three-dimensional and contains curvature in more than one axis, and can be navigated in a three-dimensional spherical manner.

Figure 9:
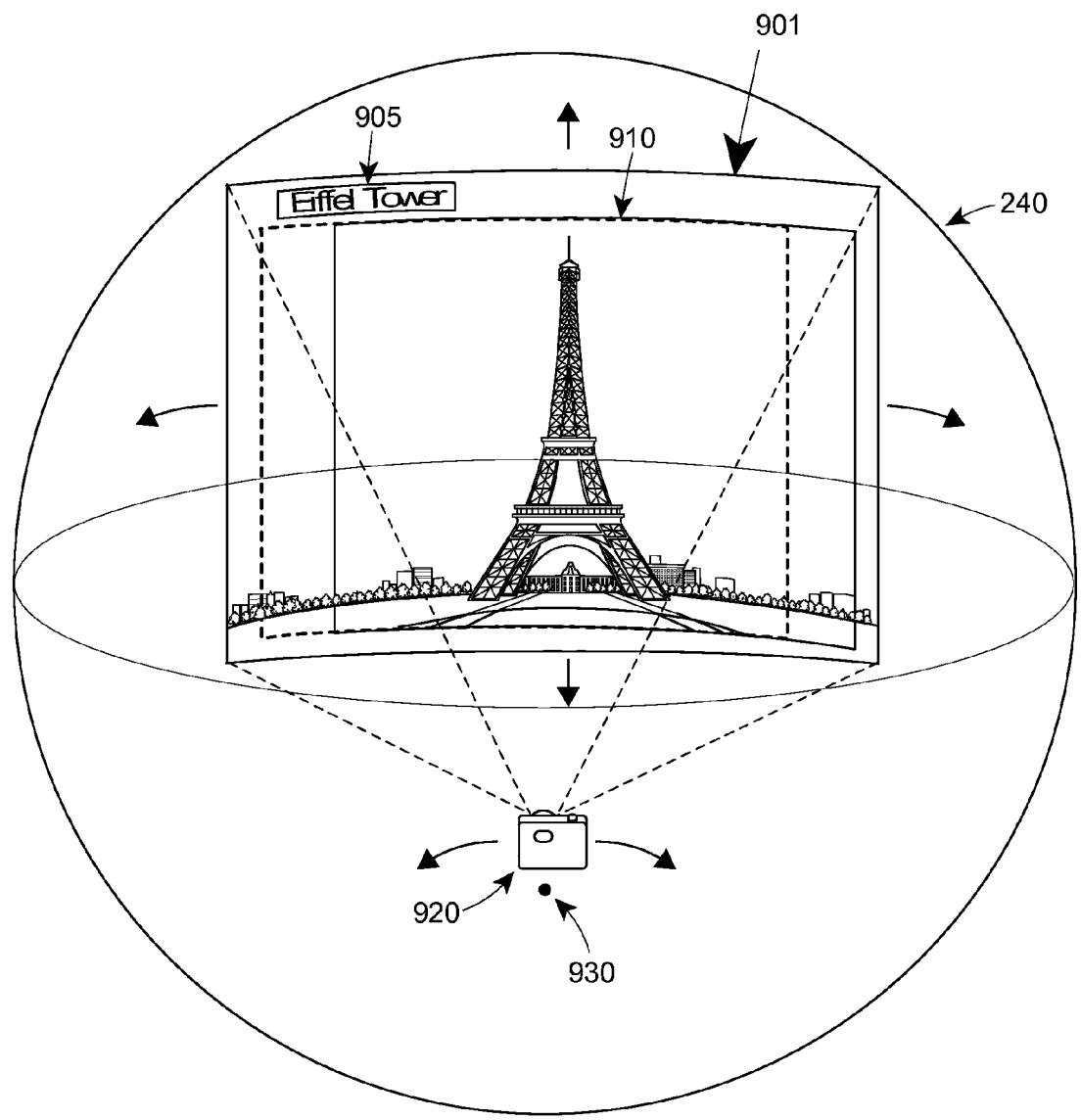
FIG. 9 is an illustration of a three-dimensional spherical viewport including a three-dimensional spherical photograph and an indication of the movements available for the viewport in a three-dimensional spherical space.

Turning to FIG. 9, the user navigates the selected three-dimensional spherical photograph 340 using an application window 901 rendered on the display 214. The application window 901 may contain similar features as the application window 300 in FIG. 3, the application window 501 in FIG. 5, and the application window 701 in FIG. 7. For example, the application window 901 contains a search box 905 and a viewport 910. However, the user navigates the three-dimensional spherical photograph 340 independent from the three-dimensional scene in the viewport 310 in FIG. 3. The user navigates the three-dimensional spherical photograph 340 by vertically and horizontally rotating the viewport 910 from the perspective of a virtual camera 920 representing a user at the center 930 of a virtual sphere. The viewport 910 may include a portion of the three-dimensional spherical photograph 340 as illustrated, or include the entire three-dimensional spherical photograph 340. The viewport 910 may be restricted from navigating outside the boundaries of the three-dimensional spherical photograph 340.

In order to indicate to the user the available horizontal and vertical rotation navigation capabilities of the viewport 910 from the perspective of the virtual camera 920 and illustrate the three-dimensional nature of the spherical photograph 340 containing curvature in more than one axis, the viewport 910 automatically moves prior to allowing navigation. The automatic movement of the viewport 910 includes a circular or strictly vertical and horizontal movement and may continue for a short duration prior to ceasing. The automatic movement of the viewport 910 in the vertical and horizontal directions from the center 930 of a virtual sphere illustrates a three-dimensional perspective for the virtual camera 920 and indicates the available navigation options for the user. When the automatic movement of the viewport 910 ceases, the available navigation options are apparent prior to any user directed navigation. Thus, when a user begins navigation of the viewport 910, the user understands the available navigation options of the three-dimensional photograph 340 under navigation.

Figure 10:
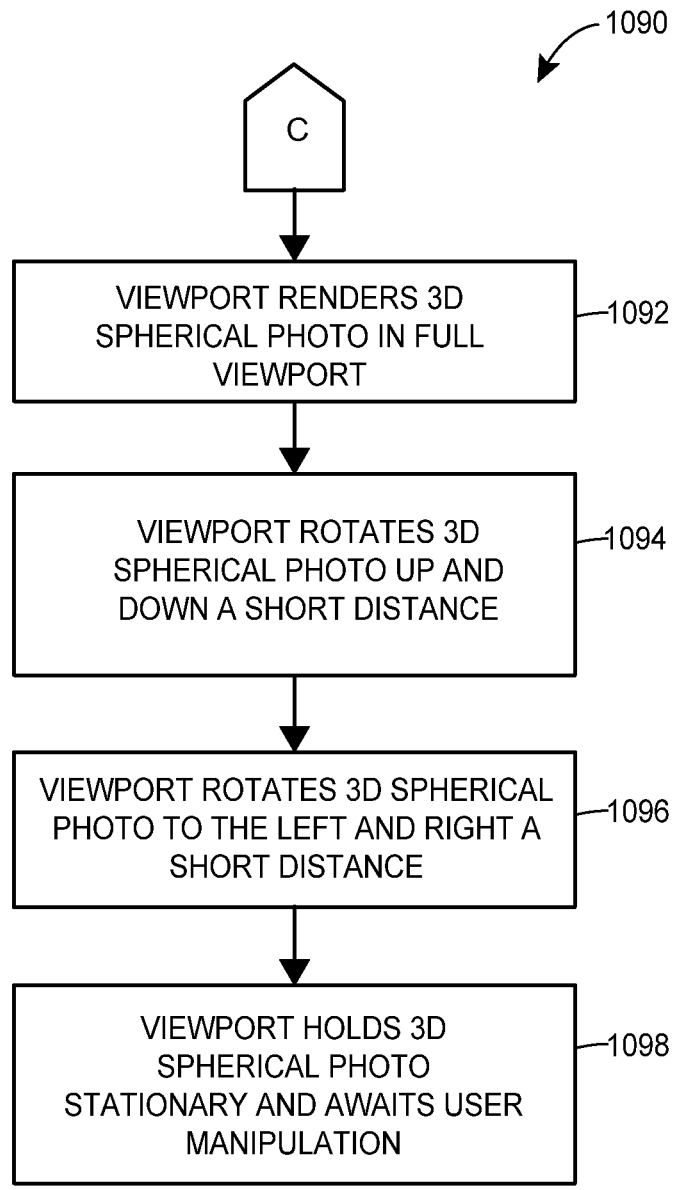
FIG. 10 is a flowchart illustrating a method that indicates the movements available for a viewport within the selected three-dimensional spherical photograph.

Turning to the method 1090 illustrated in FIG. 10, continuing from step 460 in FIG. 4, the processor 212, executing instructions 208 at a step 892 renders the three-dimensional spherical photograph 340 independent of the three-dimensional scene rendered on the display 214. The processor 212, executing instructions 208 at a step 1092 may render part or all of the three-dimensional spherical photograph 340 in a viewport of an application window, similar to the viewport 910 of the application window 901 illustrated in FIG. 9. To indicate to the user that the photograph is three-dimensional spherical containing curvature in more than one axis, and to demonstrate the available vertical range of motion of the viewport within the photograph, the processor 212 executing instructions 208 at a step 1094 renders the viewport 910 in the application window 901 on the display 214 rotating vertically up the three-dimensional spherical photograph 340 a short distance. The processor 212 continues to render the viewport 910 within the application window 901 rotating vertically down the three-dimensional spherical photograph 340 a short distance, returning to the original rendered position on the photograph 340.

Likewise, to further indicate to the user that the photograph is three-dimensional spherical containing curvature in more than one axis, and to demonstrate the available horizontal rotation of the viewport within the photograph, the processor 212 executing instructions 208 at step 1096 renders the viewport 910 in the application window 901 on the display 214 rotating horizontally left along the three-dimensional spherical photograph 340 a short distance. The processor 212 continues to render the viewport 910 within the application window 901 rotating horizontally right along the three-dimensional cylindrical photograph 340 a short distance, returning to the original rendered position on the photograph 340.

The vertical and horizontal rotation of the viewport within the three-dimensional spherical photograph subtly indicates to the user that the photograph is in fact three-dimensional spherical containing curvature in more than one axis, and demonstrate the available navigation options without obscuring the photograph with indicators or printed instructions. While steps 1094 and 1096 recite embodiments including vertical and horizontal subtle motions of the viewport 910 along the photograph 340, additional movements such as spiral, circular, or diagonal movements may provide subtle indications of the three-dimensional spherical nature of the photograph containing curvature in more than one axis, and the available navigation options in each axis.

Continuing to step 1098, the processor 212, executing instructions 208 holds the photograph 340 stationary and awaits user manipulation of the photograph 330 with the pointing device 220 or keyboard 218 within the viewport 910 in the three-dimensional horizontal and vertical directions, as demonstrated with the automatic subtle vertical and horizontal motion in steps 1094 and 1096.

Figure 11:
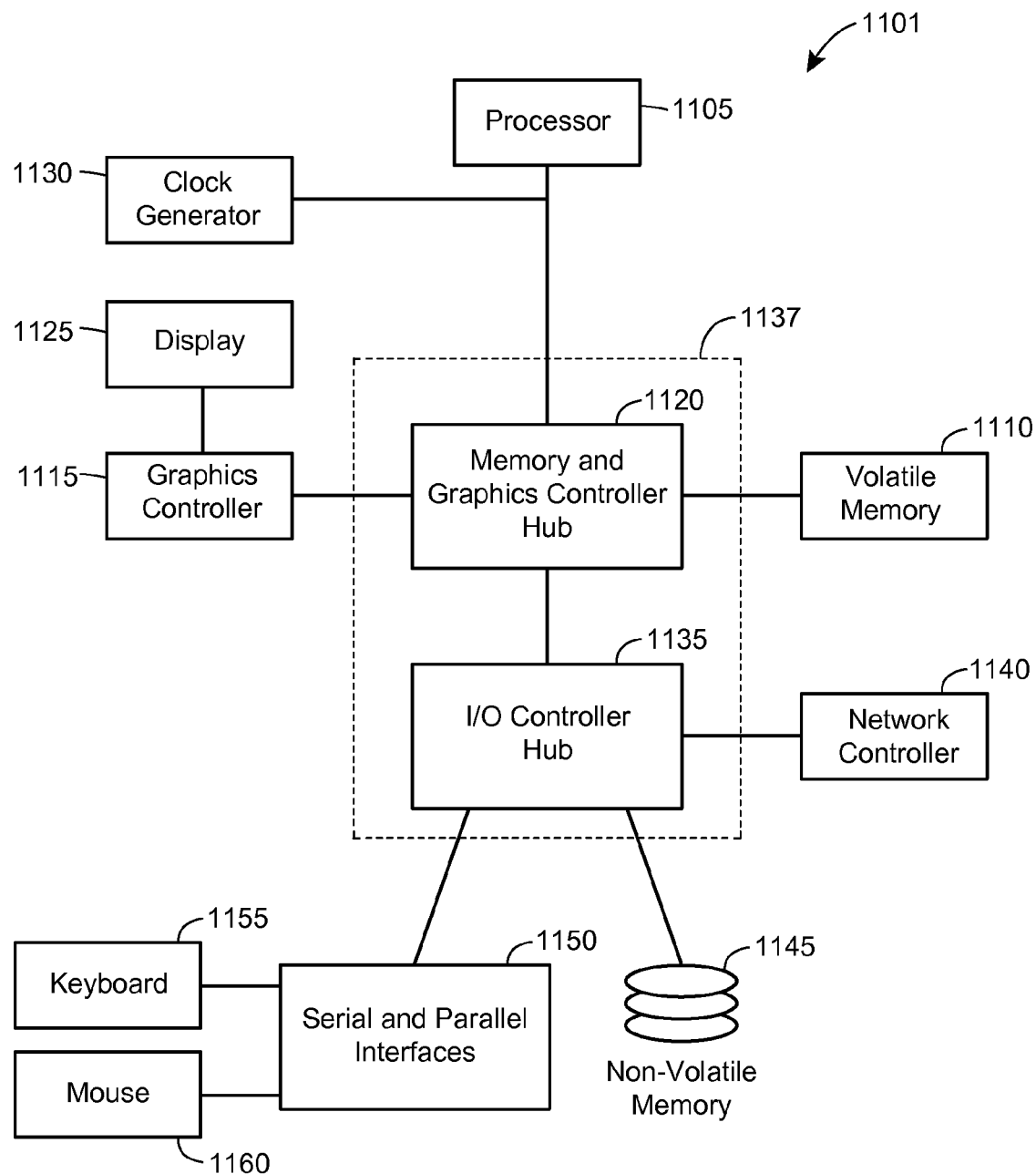
FIG. 11 is an exemplary computing system that may implement various portions of a system for indicating the movements available for a viewport within selected two-dimensional and three-dimensional photographs.

FIG. 11 illustrates a generic computing system 1101 that the system 200 may use to implement the front-end client 204 in FIG. 2, and/or the back-end server 202. The generic computing system 1101 comprises a processor 1105 for executing instructions that may be stored in volatile memory 1110. The memory and graphics controller hub 1120 connects the volatile memory 1110, processor 1105, and graphics controller 1115 together. The graphics controller 1115 may interface with a display 1125 to provide output to a user. A clock generator 1130 drives the 1105 processor and memory and graphics controller hub 1120 that may provide synchronized control of the system 1101. The I/O controller hub 1135 connects to the memory and graphics controller hub 1120 to comprise an overall system bus 1137. The hub 1135 may connect the lower speed devices, such as the network controller 1140, non-volatile memory 1145, and serial and parallel interfaces 1150, to the overall system 1101. The serial and parallel interfaces may 1150 include a keyboard 1155 and pointing device 1160 for interfacing with a user.

FIGS. 1-11 illustrate a system and method for indicating imagery type with subtle camera motions. The system comprises a front-end client that receives user interactions and displays three-dimensional scenes and two-dimensional and three-dimensional photographs. The back-end server retrieves three-dimensional scenes and two and three-dimensional photographs from databases. The method provides an automatic subtle camera movement based on imagery type to indicate whether a photograph is two or three dimensional and provides exemplary available movements of a viewport along the two and three-dimensional photographs.

Additionally, certain embodiments are described herein as including logic or a number of components, modules, or mechanisms. Modules may constitute either software modules (e.g., code or instructions embodied on a machine-readable medium or in a transmission signal, wherein a processor executes the code) or hardware modules. A hardware module is tangible unit capable of performing certain operations and may be configured or arranged in a certain manner. In example embodiments, software (e.g., an application or application portion) may configure one or more computer systems (e.g., a standalone, client or server computer system) or one or more hardware modules of a computer system (e.g., a processor or a group of processors) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, processes, or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for providing subtle camera motions to indicate imagery type. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system for providing subtle camera motions to indicate imagery type through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for indicating available types of interaction with an interactive digital image, the method comprising:
   rendering an interactive scene via a user interface;
   receiving, via the user interface, a selection of points within the interactive scene;
   identifying interactive digital images associated with the respective selected points for display via the user interface;
   determining respective image types of the identified interactive digital images; and
   rendering an animated indication of available types of movement of the identified interactive digital images via the user interface as a function of the respective determined image types, including:
      when the respective determined image type is a three-dimensional panoramic photograph having a non-zero curvature, temporarily repositioning the interactive digital image along a surface with a non-zero curvature, and
      when the respective determined image type is a two-dimensional flat photograph having zero curvature, temporarily repositioning the interactive digital image along a surface with zero curvature.

2. The computer-implemented method of claim 1 wherein rendering the animated indication of a panoramic photograph laid out on a surface with a non-zero curvature comprises rendering a rotation animation of the interactive digital image along the surface with a non-zero curvature via the user interface.

3. The computer-implemented method of claim 1 wherein rendering the animated indication of a flat photograph laid out on a surface with zero curvature comprises a panning animation of the interactive digital image along the surface with a zero curvature via the user interface.

4. A computer system for indicating the curvature of a digital image, the system comprising:
   a first processor;
   a first memory communicatively coupled to the first processor; and
   a user interface communicatively coupled to the first processor;
   wherein the first memory includes a digital image, and
   wherein the first memory includes instructions that when executed by the first processor cause the first processor to:
      i) render a representation of the digital image via the user interface;
      ii) receive a selection of the representation of the digital image from the user interface;
      iii) determine the curvature of at least one axis of the digital image, wherein zero curvature corresponds to two-dimensional flat digital imagery and non-zero curvature corresponds to three-dimensional panoramic imagery; and
      iv) render an animated indication of the determined curvature
   wherein:
      the animated indication includes movement of a virtual camera along a first trajectory when the determined curvature is zero, and the animated indication includes movement of the virtual camera along a second trajectory, different from the first trajectory, when the determined curvature is non-zero.

5. The computer system of claim 4 wherein the system further comprises:
   a second processor communicatively coupled to the first processor through a network;
   a second memory communicatively coupled to the second processor; and
   a database communicatively coupled to the second processor containing a digital image,
   wherein the first memory includes instructions that when executed by the first processor cause the first processor to:
      i) send a request to the second processor through the network to retrieve the digital image;
      ii) receive the digital image over the network; and
      iii) store the digital image in the first memory, and
   wherein the second memory includes instructions that when executed by the second processor cause the second processor to:
      i) receive a request for the digital image over the network;
      ii) retrieve the digital image from the database; and
      iii) send the digital image over the network to the first processor.

6. The computer system of claim 5 wherein the second memory includes instructions that when executed by the second processor cause the second processor to determine the curvature of at least one axis of the digital image and send an indication of the curvature of the digital image to the first processor over the network.

7. The computer system of claim 5 wherein the database comprises a plurality of digital images.

8. The computer system of claim 4 wherein the movement of the virtual camera along the first trajectory is a panning animated indication of a zero-curvature of the axis of the digital image with the user interface.

9. The computer system of claim 4 wherein the movement of the virtual camera along the second trajectory is a rotating animated indication of non-zero curvature of the axis of the digital image with the user interface.

10. The computer system of claim 4 wherein the first memory includes instructions that when executed by the first processor cause the first processor to render the animated indication of the curvature of at least one axis of the digital image with the user interface for a finite time period.

11. The computer system of claim 4 wherein the first memory includes instructions that when executed by the first processor cause the first processor to render the animated indication of the curvature of a first axis of the digital image prior to rendering the animated indication of the curvature of a second axis of the digital image with the user interface.

12. The computer system of claim 4 wherein the first memory comprises a digital image with zero curvature on more than one axis.

13. The computer system of claim 4 wherein the first memory comprises a digital image with zero curvature on a first axis and a non-zero curvature on a second axis.

14. The computer system of claim 4 wherein the first memory comprises a digital image with non-zero curvature on more than one axis.

15. A computer-implemented method for indicating the curvature of a digital image, the method comprising:
   rendering a representation of the digital image via a user interface;
   enabling selection of the representation of the digital image via the user interface;
   determining the curvature of at least one axis of the digital image, wherein zero curvature corresponds to 2D flat digital imagery and non-zero curvature corresponds to 3D panoramic imagery; and
   rendering an animated indication of the determined curvature of at least one axis of the digital image via the user interface, wherein:
      the animated indication includes movement of a virtual camera along a first trajectory when the determined curvature is zero, and
      the animated indication includes movement of the virtual camera along a second trajectory, different from the first trajectory, when the determined curvature is non-zero.

16. The computer-implemented method of claim 15 wherein the movement along the first trajectory is a panning animation of the digital image along the axis with the user interface.

17. The computer-implemented method of claim 15 wherein the movement along the second trajectory is a rotation animation of the digital image along the axis with the user interface.

18. The computer-implemented method of claim 15 wherein determining the curvature of at least one axis of the digital image comprises determining that the digital image comprises a first axis and second axis with a non-zero curvature.

19. The computer-implemented method of claim 15 wherein determining the curvature of at least one axis of the digital image comprises determining that the digital image comprises a first axis with non-zero curvature, and a second axis with zero-curvature.

20. The computer-implemented method of claim 15 wherein determining the curvature of at least one axis of the digital image comprises determining that the digital image comprises a first axis and second axis with zero-curvature.

21. The computer-implemented method of claim 15 wherein rendering the animated indication of the curvature of at least one axis of the digital image comprises a rendered animated indication that continues for a finite period of time.

22. The computer-implemented method of claim 15 wherein selecting the representation of the digital image with the user interface comprises selecting the representation of the digital image among a plurality of represented digital images rendered together in a three-dimensional scene.

23. The computer-implemented method of claim 15 wherein rendering the animated indication of the curvature of at least one axis of the digital image comprises rendering an animated indication of the curvature of a first axis prior to rendering an animated indication of the curvature of a second axis.

* * * * *